United States Patent
Yamane

(12) 
(10) Patent No.: US 11,336,201 B2
(45) Date of Patent: May 17, 2022

(54) INTEGRATED CIRCUIT AND POWER SUPPLY CIRCUIT

(71) Applicant: FUJI ELECTRIC CO., LTD., Kawasaki (JP)

(72) Inventor: Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 29 days.

(21) Appl. No.: 17/105,173

(22) Filed: Nov. 25, 2020

(65) Prior Publication Data

US 2021/0083593 A1 Mar. 18, 2021

Related U.S. Application Data

(63) Continuation of application No. PCT/JP2019/042298, filed on Oct. 29, 2019.

(30) Foreign Application Priority Data

Dec. 18, 2018 (JP) .............................. JP2018-236164

(51) Int. Cl.
  *H02M 7/217* (2006.01)
  *H02M 1/42* (2007.01)
  *H02M 3/156* (2006.01)

(52) U.S. Cl.
  CPC ......... *H02M 7/217* (2013.01); *H02M 1/4208* (2013.01); *H02M 3/156* (2013.01)

(58) Field of Classification Search
  None
  See application file for complete search history.

(56) References Cited

U.S. PATENT DOCUMENTS 8,213,135 B2 * 7/2012 Kim ................... H02M 1/4225
  361/18
8,618,747 B2 * 12/2013 Park ......................... G05F 1/70
  315/307

(Continued)

FOREIGN PATENT DOCUMENTS

EP 2381573 A1 10/2011
EP 3057221 A1 8/2016

(Continued)

OTHER PUBLICATIONS

International Search Report for PCT/JP2019/042298, dated Dec. 3, 2019.
Written Opinion for PCT/JP2019/042298, dated Dec. 3, 2019.

*Primary Examiner* — Jeffrey A Gblende
(74) *Attorney, Agent, or Firm* — Rabin & Berdo, P.C.

(57) ABSTRACT

A power supply circuit configured to generate an output voltage from a predetermined AC voltage. The power supply circuit includes a rectifier circuit rectifying the predetermined AC voltage, an inductor receiving a rectified voltage from the rectifier circuit, a transistor controlling an inductor current flowing through the inductor, and an integrated circuit configured to drive the transistor based on the inductor current and the output voltage. The integrated circuit includes a comparison circuit configured to compare a current value of the inductor current and a predetermined current value, and a timer circuit configured to receive a comparison result indicating that the current value is smaller than the predetermined current value, and output a signal indicating that the AC voltage is interrupted, when the current value has been smaller than the predetermined current value for a predetermined time period.

8 Claims, 6 Drawing Sheets

(56) References Cited

U.S. PATENT DOCUMENTS

| | | | |
|---|---|---|---|
| 9,825,517 B2* | 11/2017 | Lee | H02M 7/44 |
| 2015/0023067 A1 | 1/2015 | Terasawa | |
| 2017/0019030 A1 | 1/2017 | Sugawara | |
| 2018/0198363 A1 | 7/2018 | Watanabe | |

FOREIGN PATENT DOCUMENTS

| | | |
|---|---|---|
| JP | 2006-223070 A | 8/2006 |
| JP | 2006-343549 A | 12/2006 |
| JP | 2006-352976 A | 12/2006 |
| JP | 2010-154642 A | 7/2010 |
| JP | 2015-023722 A | 2/2015 |
| JP | 2015-122839 A | 7/2015 |
| JP | 2017-028778 A | 2/2017 |
| WO | 2017/010031 A1 | 1/2017 |

* cited by examiner

INTEGRATED CIRCUIT AND POWER SUPPLY CIRCUIT

CROSS-REFERENCE TO RELATED APPLICATIONS

This is a continuation application of International Patent Application No. PCT/JP2019/042298 filed Oct. 29, 2019, which claims the benefit of priority to Japanese Patent Application No. 2018-236164 filed Dec. 18, 2018, the entire contents of each of which are hereby incorporated herein by reference.

BACKGROUND

Technical Field

The present disclosure relates to an integrated circuit and a power supply circuit.

Description of the Related Art

An AC-DC converter is a circuit configured to generate an output voltage at a target level from an alternating current (AC) voltage. However, in general, when an AC voltage input thereto is interrupted, an output voltage drops. In such a case, a load of the AC-DC converter may not operate normally. Thus, the AC-DC converter may include a detection circuit for detecting that the AC voltage is interrupted (for example, Japanese Patent Application Publication No. 2006-223070).

In general, such a detection circuit for detecting interruption of the AC voltage is configured with a large number of discrete components. This causes an increase in the cost of the AC-DC converter.

The present disclosure has been achieved in light of the foregoing description, to provide an integrated circuit capable of detecting that an AC voltage is interrupted at low cost.

SUMMARY

A primary aspect of the present disclosure is an integrated circuit for power supply circuit that includes a rectifier circuit configured to rectify an alternating current (AC) voltage, an inductor configured to receive a rectified voltage from the rectifier circuit, and a transistor configured to control an inductor current flowing through the inductor, the integrated circuit being configured to switch the transistor based on the inductor current and an output voltage of the power supply circuit generated from the AC voltage, the integrated circuit comprising: a comparison circuit configured to compare a current value of the inductor current and a first current value; and a timer circuit configured to receive a first comparison result from the comparison circuit indicating that the current value of the inductor current is smaller than the first current value, and output a first signal indicating that the AC voltage is interrupted, upon detecting that the current value of the inductor current has been smaller than the first current value for a predetermined time period.

In addition, a secondary aspect of the present disclosure is a power supply circuit configured to generate an output voltage from a predetermined alternating current (AC) voltage, the power supply circuit comprising: a rectifier circuit configured to rectify the predetermined AC voltage; an inductor configured to receive a rectified voltage from the rectifier circuit; a transistor configured to control an inductor current flowing through the inductor; and an integrated circuit configured to drive the transistor based on the inductor current and the output voltage, the integrated circuit including a comparison circuit configured to compare a current value of the inductor current and a predetermined current value, and a timer circuit configured to receive a comparison result from the comparison circuit indicating that the current value of the inductor current is smaller than the predetermined current value, and output a signal indicating that the AC voltage is interrupted, when the current value of the inductor current has been smaller than the predetermined current value for a predetermined time period.

According to the present disclosure, it is possible to provide an integrated circuit capable of detecting that an AC voltage is interrupted at low cost.

DETAILED DESCRIPTION

At least the following matters become apparent from the description of the present specification and the accompanying drawings.

Embodiments

Figure 1:
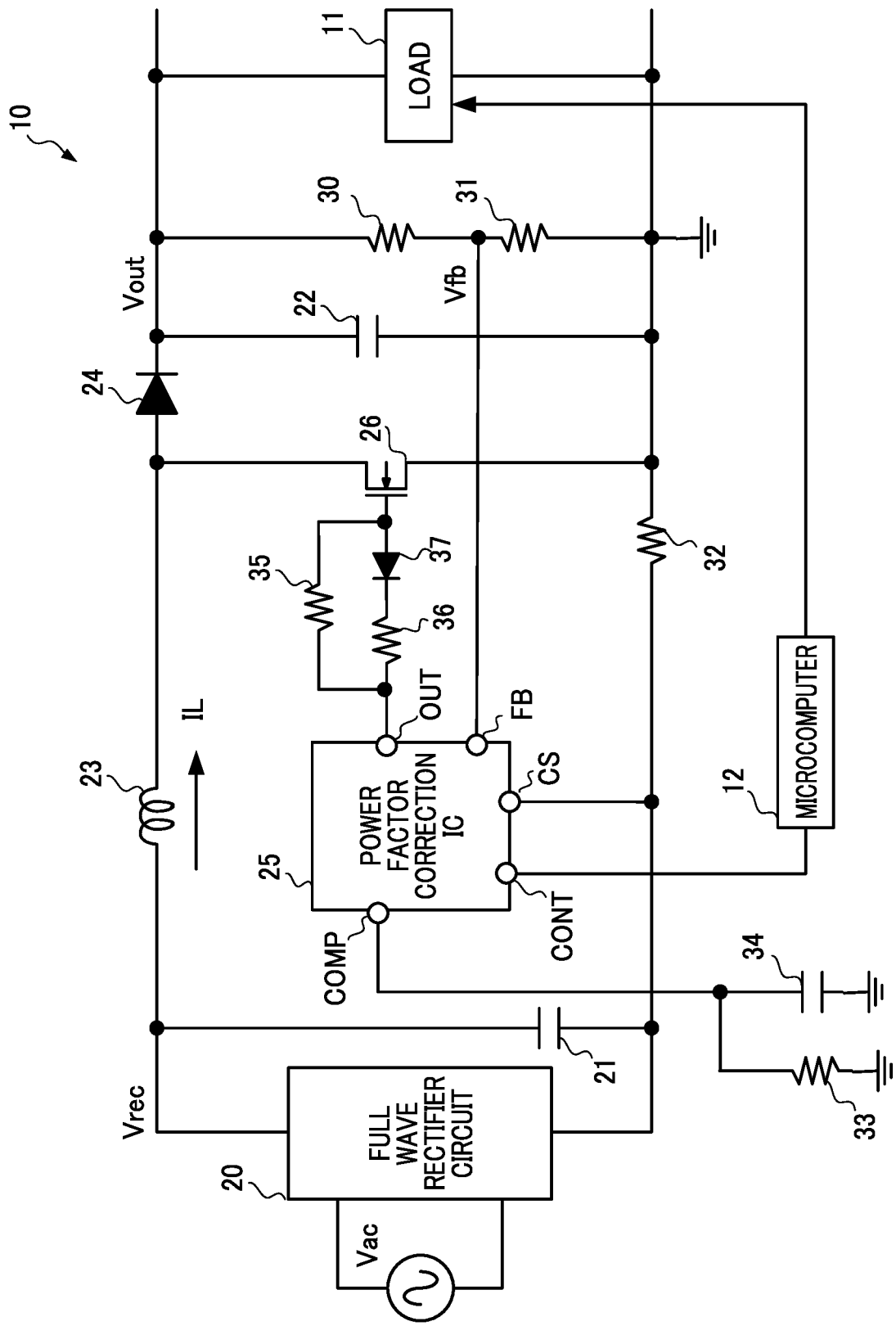
FIG. 1 is a diagram illustrating an example of an AC-DC converter 10.

FIG. 1 is a diagram illustrating a configuration of an AC-DC converter 10 according to one embodiment of the present disclosure. The AC-DC converter 10 is a boost-chopper-type power supply circuit that generates an output voltage Vout at a target level from an alternating current (AC) voltage Vac of a commercial power supply.

A load 11 is a DC-DC converter or an electronic device that operates with a direct current (DC) voltage, for example.

A microcomputer 12 is a control circuit that reduces the power consumption of the load 11, for example, when the AC voltage Vac is interrupted.

<<<Outline of AC-DC Converter 10>>>

The AC-DC converter 10 comprises a full-wave rectifier circuit 20, capacitors 21, 22, and 34, an inductor 23, a diode 24, a power factor correction IC (integrated circuit) 25, an NMOS (N-type Metal Oxide Semiconductor) transistor 26, and resistors 30 to 33.

The full-wave rectifier circuit 20 full-wave rectifies the applied predetermined AC voltage Vac, and outputs the rectified voltage, as a voltage Vrec, to the capacitor 21 and the inductor 23. Note that the AC voltage Vac has, for example, a voltage of 100 to 240 V and a frequency of 50 to 60 Hz.

The capacitor 21 smooths the voltage Vrec, and the capacitor 22, the inductor 23, the diode 24, and the NMOS transistor 26 configure a boost chopper circuit. Accordingly, the charge voltage of the capacitor 22 results in a DC output voltage Vout. Note that the output voltage Vout is, for example, 400 V.

The power factor correction IC 25 is an integrated circuit that controls switching of the NMOS transistor 26 such that the output voltage Vout reaches the target level (e.g., 400 V) while improving a power factor of the AC-DC converter 10. In specific, the power factor correction IC 25 drives the NMOS transistor 26 based on an inductor current IL flowing through the inductor 23 and the output voltage Vout. The details of the power factor correction IC 25 will be described later, but the power factor correction IC 25 has terminals CS, FB, CONT, COMP, and OUT. Note that the power factor correction IC 25 has terminals other than the foregoing five terminals CS, FB, CONT, COMP, and OUT, but they are omitted for convenience.

The NMOS transistor 26 is a transistor that controls power to the load 11 in the AC-DC converter 10. In an embodiment of the present disclosure, it is assumed that the NMOS transistor 26 is a Metal Oxide Semiconductor (MOS) transistor, but the present disclosure is not limited thereto. The NMOS transistor 26 may be, for example, a bipolar transistor or an Insulated Gate Bipolar Transistor (IGBT), as long as it is a transistor capable of controlling power. In addition, the gate electrode of the NMOS transistor 26 is connected such that the NMOS transistor 26 is driven in response to a signal from the terminal OUT. Note that, according to an embodiment of the present disclosure, resistors 35 and 36 and a diode 37 are connected between the gate electrode of the NMOS transistor 26 and the terminal OUT, to reduce switching noise and the like.

The resistors 30 and 31 configure a voltage divider circuit that divides the output voltage Vout, and generates a feedback voltage Vfb to be used when switching the NMOS transistor 26. The feedback voltage Vfb generated at the node at which the resistors 30 and 31 are connected is applied to the terminal FB.

The resistor 32 detects the inductor current IL, and has one end connected to the source electrode of the NMOS transistor 26 and the other end connected to the terminal CS. Note that, in an embodiment of the present disclosure, a voltage, indicative of the inductor current IL, to be input to the terminal CS is given as a voltage Vcs. This voltage Vcs may be a voltage to be applied to the terminal CS from an inverting amplifier circuit (not illustrated) that inverts and amplifies the voltage generated at the resistor 32 with reference to the voltage (0 V) at the source electrode of the grounded NMOS transistor 26, for example. In this case, the voltage Vcs to be applied to the terminal CS rises with an increase in the inductor current IL. Such inversion between positive and negative polarities may be performed inside the power factor correction IC 25.

The resistor 33 and the capacitor 34, which will be described later in detail, are elements for phase compensation of the power factor correction IC 25 that is feedback-controlled, and provided between the terminal COMP and the ground.

<<<Configuration of Power Factor Correction IC 25>>>

Figure 2:
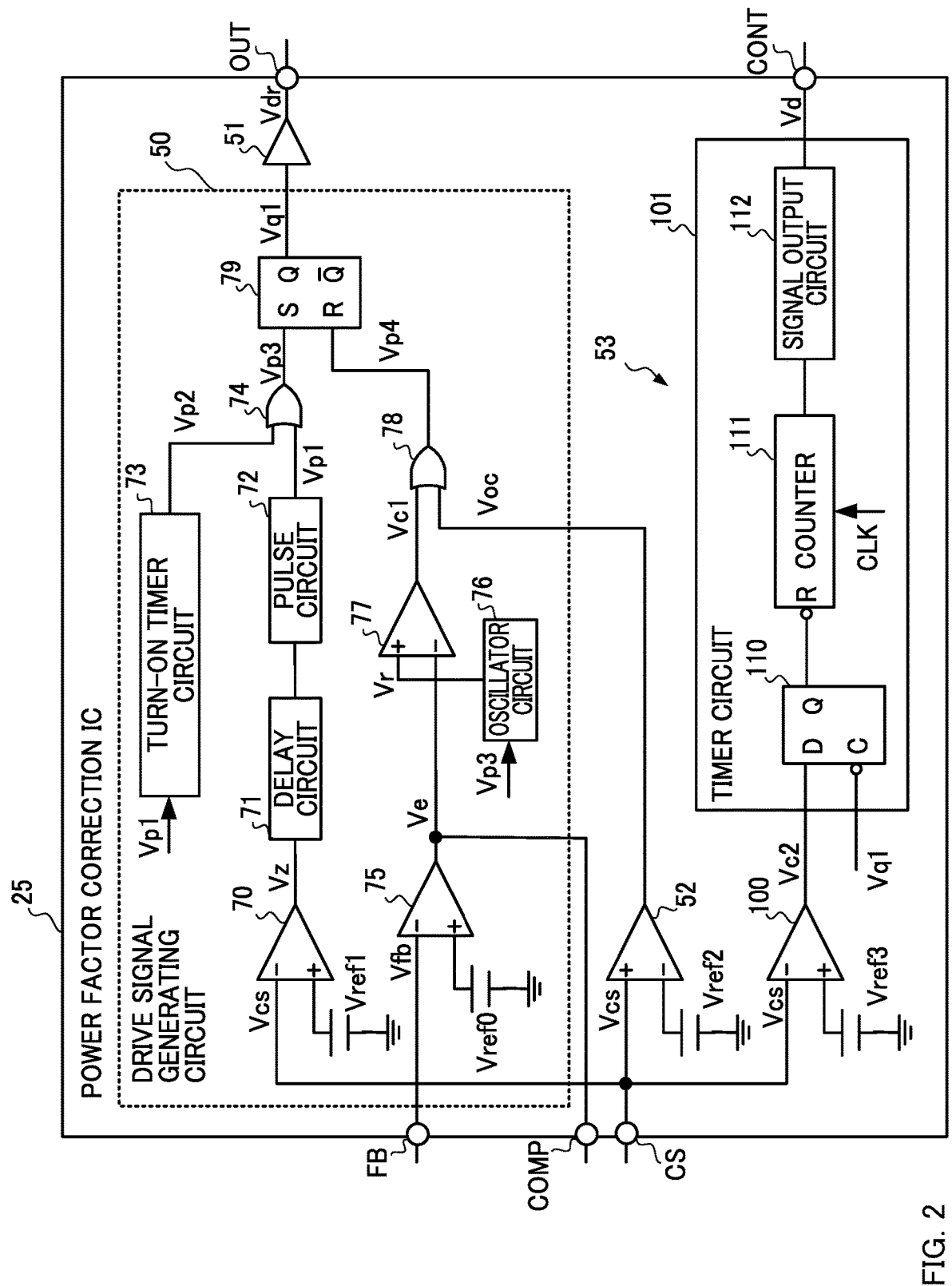
FIG. 2 is a diagram illustrating an example of a power factor correction IC 25.

FIG. 2 is a diagram illustrating one example of a configuration of the power factor correction IC 25. The power factor correction IC 25 comprises a drive signal generating circuit 50, a drive circuit 51, a comparator 52, and a detection circuit 53. Note that FIG. 2 illustrates the terminals at positions different from the positions illustrated in FIG. 1 such that, for example, the terminal CONT is provided on the same side as the terminal OUT for convenience, however, wiring connected to the terminals, the elements, and the like are the same between FIG. 1 and FIG. 2.

<<Drive Signal Generating Circuit 50>>

The drive signal generating circuit 50 generates a drive signal Vq1 for turning on and off the NMOS transistor 26 based on the voltage Vcs indicative of the inductor current IL and the feedback voltage Vfb. The drive signal generating circuit 50 comprises comparators 70 and 77, a delay circuit 71, a pulse circuit 72, a turn-on timer circuit 73, OR circuits 74 and 78, an error amplifier circuit 75, an oscillator circuit 76, and an SR flip-flop 79.

The comparator 70 detects whether the current value of the inductor current IL is substantially zero. Specifically, the comparator 70 compares levels between the voltage Vcs applied to the terminal CS and the reference voltage Vref1 corresponding to a current value Ia (second current value) slightly larger than zero such as several mA, and detects whether the current value of the inductor current IL is substantially zero (hereinafter, "substantially zero" is simply referred to as zero). Although described later in detail, in an embodiment of the present disclosure, when the voltage Vcs drops below the reference voltage Vref1, the comparator 70 outputs a signal Vz at a high level (hereinafter, referred to as high of high level) indicating that the inductor current IL is zero.

When the high signal Vz is output from the comparator 70, the delay circuit 71 delays the signal Vz by a predetermined time period and outputs the delayed signal Vz.

When the high signal Vz is output from the delay circuit 71, the pulse circuit 72 (first pulse circuit) outputs a high pulse signal Vp1 (first pulse signal).

The turn-on timer circuit 73 (second pulse circuit) outputs a pulse signal Vp2 (second pulse signal) for turning on the NMOS transistor 26, when the power factor correction IC 25 is activated, or when the AC voltage Vac is interrupted and the pulse signal Vp1 is not output. Specifically, when the pulse signal Vp1 is not output during a predetermined time period, the high pulse signal Vp2 is output every predetermined time period.

The OR circuit 74 calculates and outputs a logical sum of the pulse signals Vp1 and Vp2. Accordingly, in an embodiment of the present disclosure, the pulse signal Vp1 or the pulse signal Vp2 is output from the OR circuit 74 as a pulse signal Vp3.

The error amplifier circuit 75 amplifies an error between the feedback voltage Vfb applied to the terminal FB and a predetermined reference voltage Vref0. Note that the reference voltage Vref0 is determined according to the output voltage Vout at the target level. Further, the resistor 33 and the capacitor 34 for phase compensation are connected between the output of the error amplifier circuit 75 and the ground via the terminal COMP. It is assumed here that a voltage at a node at which the output of the error amplifier circuit 75 and the terminal COMP are connected is a voltage Ve.

The oscillator circuit 76 outputs a ramp wave Vr whose amplitude gradually increases every time when the high pulse signal Vp3 is input thereto.

The comparator 77 compares levels between the voltage Ve and the ramp wave Vr, and outputs a signal Vc1 as the comparison result. Here, the voltage Ve is applied to the inverting input terminal of the error amplifier circuit 75, while the ramp wave Vr is applied to the non-inverting input terminal of the error amplifier circuit 75. Accordingly, when the ramp wave Vr is lower in level than the voltage Ve, the signal Vc1 becomes a low level (hereinafter, low or low level), and when the ramp wave Vr increases higher in level than the voltage Ve, the signal Vc1 goes high.

An OR circuit 78 calculates and outputs a logical sum of the signal Vc1 and a high signal Voc (described later) indicative of occurrence of an overcurrent. Thus, the high signal Vc1 or the high signal Voc is output from the OR circuit 78 as a pulse signal Vp4.

The SR flip-flop 79 (drive signal output circuit) has an S input to which the signal Vp3 is input, and an R input to which the signal Vp4 is input. Thus, the drive signal Vq1 which is a Q output of the SR flip-flop 79 goes high when the signal Vp3 goes high. In contrast, the drive signal Vq1 goes low when the signal Vp4 goes high.

<<Drive Circuit 51>>

The drive circuit 51 is a buffer circuit configured to drive the NMOS transistor 26 in response to the drive signal Vq1. Specifically, the drive circuit 51 drives the NMOS transistor 26 having a large gate capacitance, using a signal Vdr having the same logic level as the logic level of the signal input to the drive circuit 51. In addition, the drive circuit 51 turns on the NMOS transistor 26 in response to the high drive signal Vq1, and turns off the NMOS transistor 26 in response to the low drive signal Vq1.

<<Comparator 52>>

The comparator 52 is a circuit for comparing the voltage Vcs with a reference voltage Vref2, thereby detecting whether the inductor current IL is in an overcurrent condition. Note that the "overcurrent" refers to a condition in which the inductor current IL reaches a "current value Ib" (e.g., a current value corresponding to 90% of the current value allowable for the inductor 23 and the NMOS transistor 26). Accordingly, in an embodiment of the present disclosure, the level of the reference voltage Vref2 is set such that the voltage Vcs is higher than the reference voltage Vref2 when the inductor current IL exceeds the "current value Ib". Note that the comparator 52 changes a voltage Voc to high when the overcurrent condition occurs and the voltage Vcs rises above the reference voltage Vref2. As a result, the drive signal Vq1 goes low, which results in the NMOS transistor 26 being turned off.

<<Detection Circuit 53>>

The detection circuit 53 is a circuit for detecting whether the AC voltage Vac is in an interrupted state. Note that here "the AC voltage Vac is in an interrupted state" indicates, for example, a state in which the AC voltage Vac is not supplied to the AC-DC converter 10 and is not applied to the full-wave rectifier circuit 20. The detection circuit 53 comprises a comparator 100 and a timer circuit 101.

The comparator 100 is a circuit that compares the current value of the inductor current IL and a current value Ic based on the comparison in level between the voltage Vcs and a voltage Vref3. Here, "the current value Ic (first current value)" is, for example, larger than the current value Ia detected by the comparator 70, and a positive current value closer to zero (e.g., several tens of mA). In addition, the signal Vc2, which is output from the comparator 100 as a comparison result, goes low when the current value of the inductor current IL is larger than the current value Ic, and the signal Vc2 goes high when the current value of the inductor current IL is smaller than the current value Ic.

The timer circuit 101 measures a time period of a state in which the current value of the inductor current IL is smaller than the current value Ic. Then, when a state in which the current value of the inductor current IL has been smaller than the current value Ic for a predetermined time period Tx, the timer circuit 101 outputs a high signal Vd (first signal) indicating that the AC voltage Vac is interrupted. In contrast, when the AC voltage Vac is not interrupted, in other words, the predetermined AC voltage Vac is supplied to the AC-DC converter 10, and is applied to the full-wave rectifier circuit 20, the timer circuit 101 outputs the low signal Vd (second signal).

Here, the "predetermined time period Tx" is a time period to be set to determine whether the AC voltage Vac is interrupted, based on a state in which the current value of the inductor current IL is smaller than the current value Ic. Accordingly, the "predetermined time period Tx" is set such that, for example, when the current consumption of the load 11 is a predetermined value, the predetermined time period TX is longer than a time period in which the inductor current IL when the AC voltage Vac is applied to the full-wave rectifier circuit 20 and the NMOS transistor 26 is on is smaller than the current value Ic in the half cycle of the AC voltage Vac, and the predetermined time period TX is shorter than the half cycle of the AC voltage Vac. For example, when the half cycle of the AC voltage Vac is 10 ms, the predetermined time period Tx is 1.5 ms, which is a time period of about 10 to 20% of the half cycle.

The timer circuit 101 comprises a D flip-flop 110, a counter 111, and a signal output circuit 112.

The D flip-flop 110 (holding circuit) has a D input to which the signal Vc2 is input, and a C input to which the inverted drive signal Vq1 is input. Thus, when the D input is high at the falling timing at which the drive signal Vq1 goes low (timing when the NMOS transistor 26 is changed to off from on), in other words, when the inductor current IL is smaller than the current value Ic, a Q output is high. In contrast, when the D input is low at the timing when the drive signal Vq1 goes low, in other words, when the inductor current IL is larger than the current value Ic, the Q output goes low.

When the Q output of the D flip-flop 110 is high, the counter 111 increments a count value C in response to a clock signal CLK having a predetermined cycle. In addition, the counter 111 resets the count value C when the Q output of the D flip-flop 110 is low. Accordingly, the count value C of the counter 111 is incremented when the D flip-flop 110 holds the high signal Vc2 (first comparison result) indicating that the inductor current IL is smaller than the current value Ic. In addition, the count value C of the counter 111 is reset when the D flip-flop 110 holds the low signal Vc2 (second comparison result) indicating that the inductor current IL is larger than the current value Ic.

The signal output circuit 112 outputs the high signal Vd (first signal), when the count value C of the counter 111 reaches a predetermined count value C1 corresponding to the predetermined time period Tx. In contrast, the signal output circuit 112 outputs the low signal Vd (second signal), until the count value C of the counter 111 reaches the count value C1.

==Operation of Power Factor Correction IC 25==

<<<Case that AC Voltage Vac is Input>>>

Figure 3:
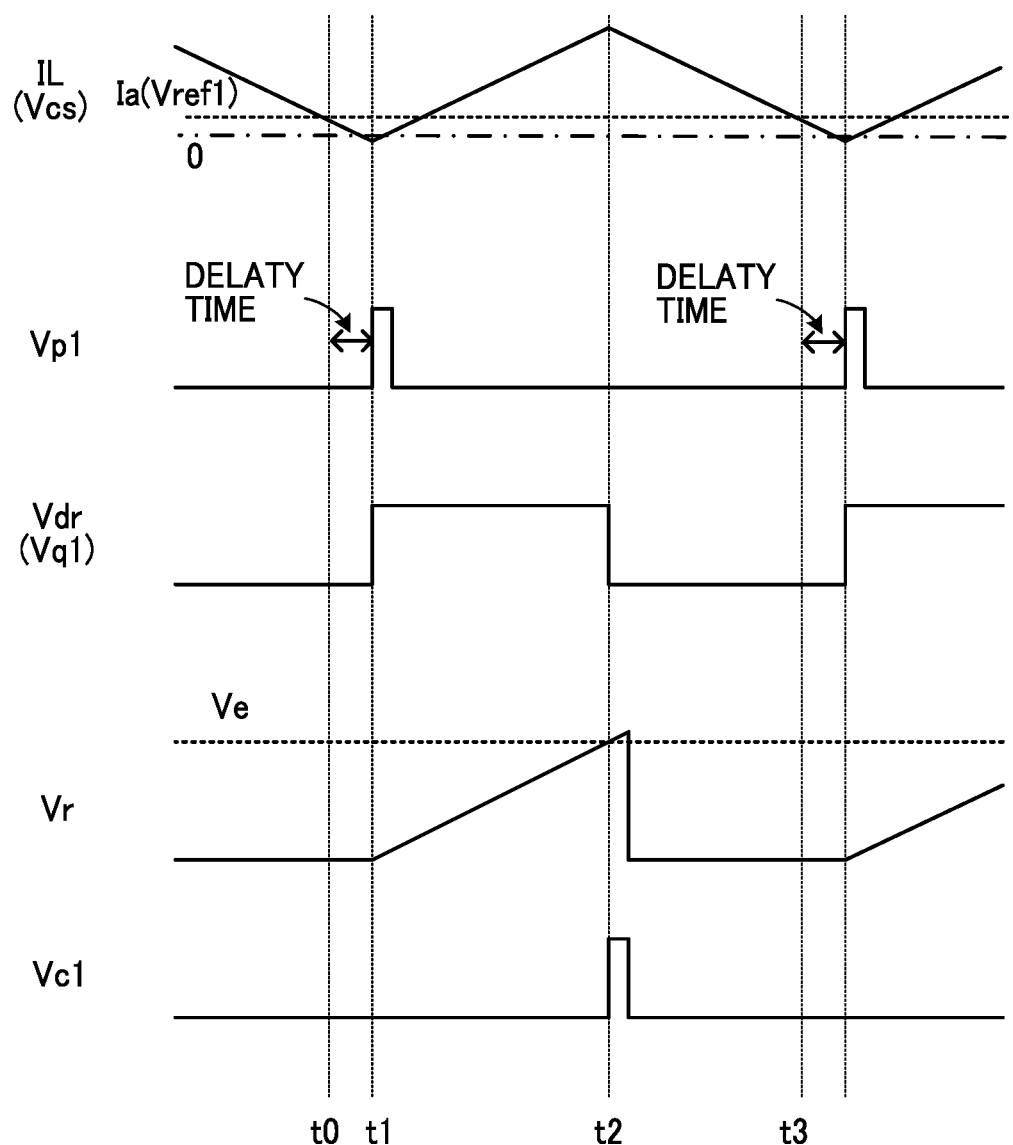
FIG. 3 is a diagram for explaining an operation of a power factor correction IC 25.

With reference to FIG. 3, a description will be given of an operation of the power factor correction IC 25 when the AC-DC converter 10 generates the output voltage Vout at the target level from the predetermined AC voltage Vac and supplies power to a constant load. Note that, here, the operations of the drive signal generating circuit 50 and the drive circuit 51 in the power factor correction IC 25 will be mainly described.

First, when the inductor current IL decreases and reaches the current value Ia at time t0, in other words, the voltage Vcs drops and reaches the reference voltage Vref1, the comparator 70 changes the signal Vz to high (not illustrated in FIG. 3). In addition, at time t1 when the delay time in the delay circuit 71 has elapsed since the time t0, the pulse circuit 72 outputs the pulse signal Vp1.

Then, when the pulse signal Vp1 is output, the SR flip-flop 79 outputs the high drive signal Vq1, and thus the signal Vdr goes high as well. This results in turning on the NMOS transistor 26 and increasing the inductor current IL.

In addition, when the pulse signal Vp1 is output, the pulse signal Vp3 goes high as well, and thus the amplitude of the ramp wave Vr from the oscillator circuit 76 increases. Then, when the amplitude level of the ramp wave Vr rises higher than the level of the voltage Ve at time t2, the comparator 77 changes the signal Vc1 to high. As a result, the SR flip-flop 79 is reset, and the signal Vdr goes low. When the signal Vdr goes low, the NMOS transistor 26 is turned off, and thus the inductor current IL gradually decreases. Further, when the inductor current IL decreases and reaches the current value Ia at time t3, the operations from the time t0 are repeated.

Here, when the AC-DC converter 10 generates the output voltage Vout at the target level from the predetermined AC voltage Vac and supplies power to the load that is constant, the feedback voltage Vfb is constant. As a result, the voltage Ve output from the error amplifier circuit 75 is constant as well, and thus a time period (e.g., a time period from the time t1 to the time t2) during which the NMOS transistor 26 is on is constant as well.

Figure 4:
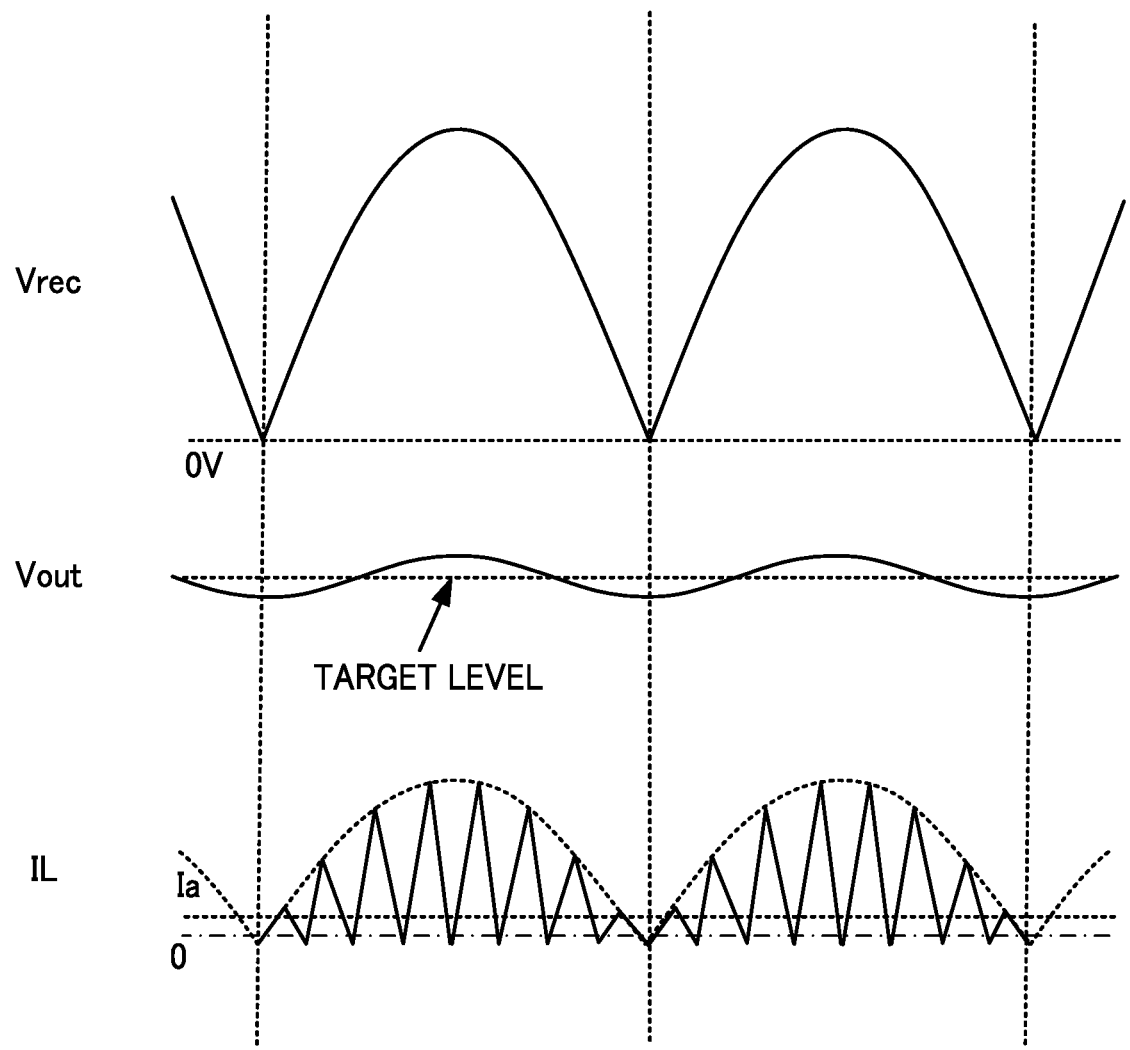
FIG. 4 is a diagram for explaining an operation of an AC-DC converter 10 when an AC voltage is input thereto.

In addition, in the case that the NMOS transistor 26 is turned on, when the level of the voltage Vrec obtained by rectifying the AC voltage Vac rises, the current value of the inductor current IL also increases. As a result, as illustrated in FIG. 4, the peak waveform of the inductor current IL results in the same waveform as of the voltage Vrec, thereby improving the power factor.

<<<Case that AC Voltage Vac is Interrupted and then Restored>>>

Figure 5:
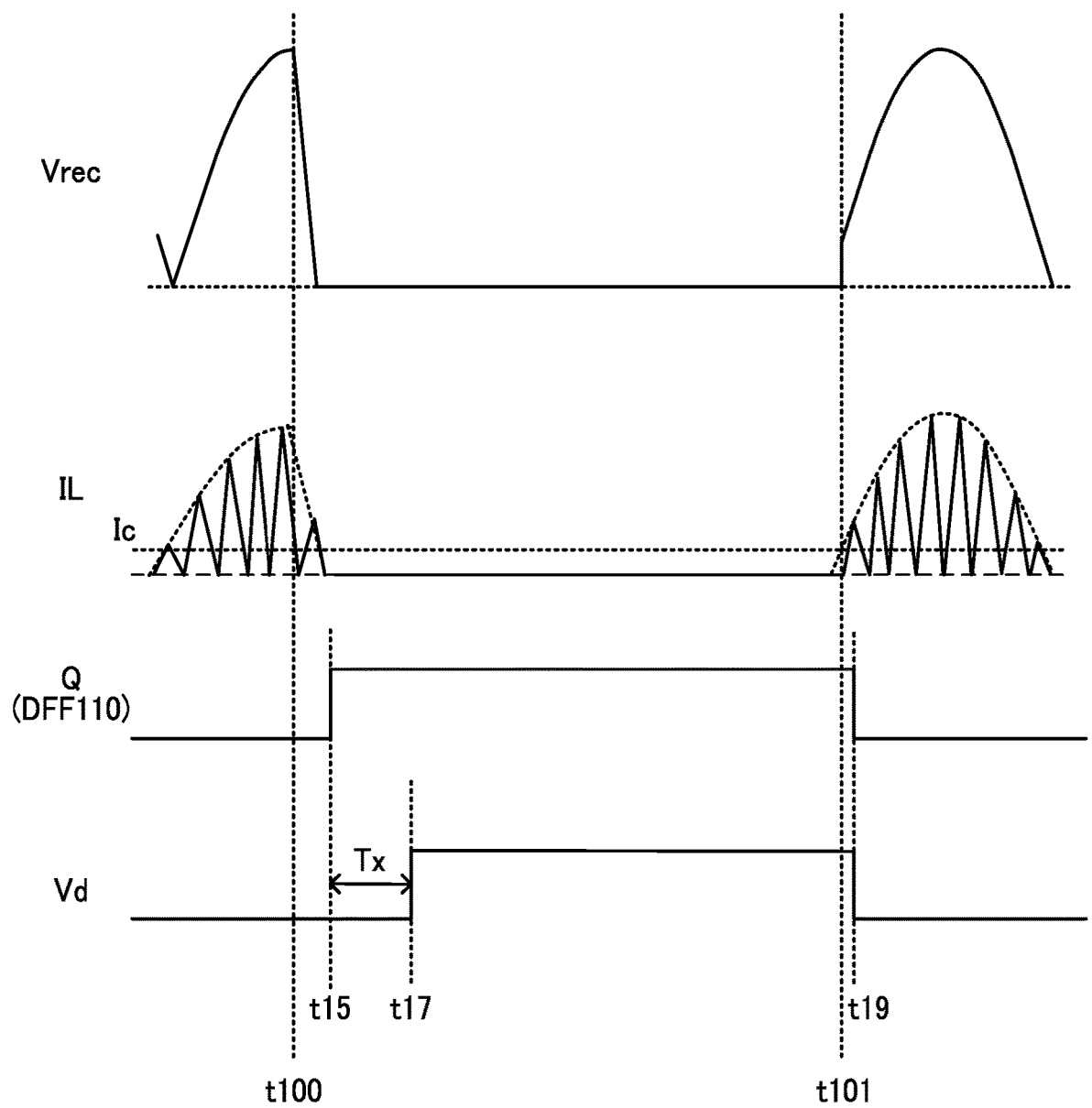
FIG. 5 is a diagram for explaining an operation of a power factor correction IC 25 when an AC voltage is interrupted/restored.
Figure 6:
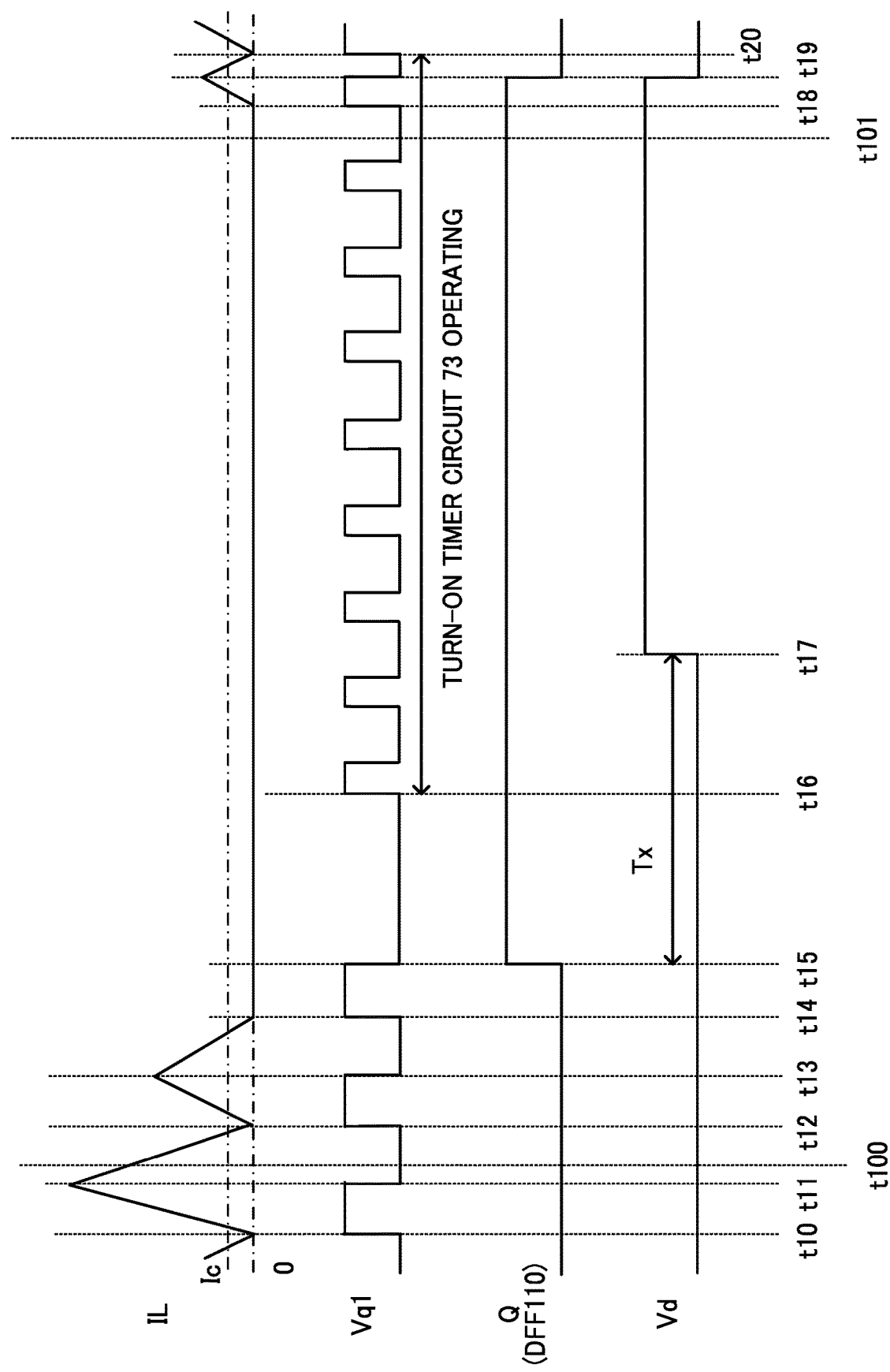
FIG. 6 is a diagram for explaining an operation of a power factor correction IC 25 when an AC voltage is interrupted/restored.

With reference to FIGS. 5 and 6, a description will be given of an operation of the power factor correction IC 25 when the AC voltage Vac is interrupted. Note that FIG. 6 is a diagram illustrating the details of changes of main signals in the power factor correction IC 25 from when the AC voltage Vac is interrupted to when the AC voltage Vac is restored. In an embodiment of the present disclosure, it is assumed that the AC voltage Vac is interrupted at time t100, and the AC voltage Vac is restored at time t101. In addition, here, while the AC voltage Vac is being input, the power factor correction IC 25 is operated as illustrated in FIGS. 3 and 4.

As illustrated in FIG. 6, when the signal Vq1 goes high at time t10 before the AC voltage Vac is interrupted, the NMOS transistor 26 is turned on and the inductor current IL increases.

When the signal Vq1 goes low at time t11, the NMOS transistor 26 is turned off and the inductor current IL decreases. In addition, the D flip-flop 110 of the timer circuit 101 holds the signal Vc2 which is the comparison result of the comparator 100 at a timing when the signal Vq1 goes low at the t11. Note that, here, since the current value of the inductor current IL is larger than the current value Ic, the D flip-flop 110 holds the low signal Vc2. As a result, the Q output of the D flip-flop 110 goes low, and the count value C of the counter 111 is reset. Accordingly, at the time t11, the signal Vd from the signal output circuit 112 goes low as well.

Then, at time t100 after the time t11, since the AC voltage Vac is interrupted, the level of the voltage Vrec drops rapidly as illustrated in FIG. 5.

When the signal Vq1 goes high at time t12 after the AC voltage Vac is interrupted and the inductor current IL reaches zero, the NMOS transistor 26 is turned on. Here, at the time t12, the voltage Vrec has not dropped to zero, and thus the inductor current IL increases, to become larger than the current value Ic, for example.

When the signal Vq1 goes low at time t13, the NMOS transistor 26 is turned off, and the inductor current IL decreases. In addition, at the time t13 as well, the D flip-flop 110 holds the low signal Vc2 as at the time t11. Thus, at the time t13 as well, both the Q output of the D flip-flop 110 and the signal Vd are low.

When the signal Vq1 goes high at time t14 after the inductor current IL reaches zero, the NMOS transistor 26 is turned on. Here, if the voltage Vrec has dropped to zero, for example, at time t14, the current value of the inductor current IL is also substantially zero without increasing.

Then, when the signal Vq1 goes low at time t15, the D flip-flop 110 holds the signal Vc2 which is the comparison result of the comparator 100, as at the times t11 and t13. Here, at the time t15, the high signal Vc2 is output from the comparator 100, and thus the Q output of the D flip-flop 110 is changed to high. Further, when the Q output of the D flip-flop 110 goes high, the counter 111 increments the count value C.

In addition, the inductor current IL reaches zero, and then at time t16, at which a predetermined time period has elapsed from the time t15 at which the operation of the pulse circuit 72 is substantially stopped, a turn-on timer circuit 73 outputs the pulse signal Vp2 instead of the pulse circuit 72. As a result, the drive signal Vq1 changes as illustrated in FIG. 6. Note that, from the time t16 to the time t101 at which the AC voltage Vac is restored, the current value of the inductor current IL is substantially zero. Accordingly, during this time period, the current value of the inductor current IL does not exceed the current value Ic. Thus, in this time period, the counter 111 is not reset, and the count value C continues to be incremented.

Then, at time t17 when the predetermined time period Tx has elapsed since the time t15, the count value C reaches the predetermined count value C1. Thus, the signal output circuit 112 outputs the high signal Vd. As a result, the high signal Vd indicating that the AC voltage Vac is interrupted is output to the terminal CONT. Accordingly, the microcomputer 12 (control circuit) illustrated in FIG. 1 can control the load 11, to which the output voltage Vout is applied, to be in a light load condition or no load condition (condition in which current consumption is small).

In addition, when the AC voltage Vac is restored at the time t101, the voltage Vrec also rises as illustrated in FIG. 5. As a result, when the NMOS transistor 26 is turned on in response to the high signal Vq1, for example, at time t18, the inductor current IL increases.

Then, at time t19 when the signal Vq1 goes low, the current value of the inductor current IL is larger than the current value Ic, the signal Vc2 indicating the comparison result of the comparator 100 goes low. As a result, the D flip-flop 110 holds the low signal Vc2, and thus the Q output is changed to low. This results in the count value C of the counter 111 being reset and the signal Vd being changed to low. Furthermore, here, the low signal Vd indicating that the AC voltage Vac is restored is output to the terminal CONT. Accordingly, the microcomputer 12 illustrated in FIG. 1 stops controlling the load 11 to be in a light load condition or no load condition.

In addition, at time t20 when the inductor current IL decreases and the comparator 70 outputs a high signal, the pulse circuit 72 resume an operation instead of the turn-on timer circuit 73. Thereafter, for example, the operations from the times t10 to t12 are repeated. As a result, the AC-DC converter 10 performs operations illustrated in FIGS. 3 and 4. Note that, as described above, the signal Vd from the detection circuit 53 is output to the terminal CONT. Accordingly, a user of the power factor correction IC 25 can grasp the interruption of the AC voltage Vac by monitoring the level of the terminal CONT.

===Summary===

Hereinabove, the AC-DC converter 10 according to an embodiment of the present disclosure has been described. The power factor correction IC 25 includes the detection circuit 53 configured to detect that the AC voltage Vac is interrupted. Thus, when the AC-DC converter 10 is realized, it is not necessary to configure a circuit for detecting the AC voltage Vac using discrete components and the like. Accordingly, with the use of the power factor correction IC 25, the AC-DC converter 10 can detect the interruption of the AC voltage Vac at low cost.

In addition, when the AC voltage Vac is restored after the interruption thereof, the inductor current IL also increases. The detection circuit 53 according to an embodiment of the present disclosure detects that the AC voltage Vac is interrupted based on the signal Vc2 which is the result of comparison between the current value of the inductor current IL and the current value Ic is restored (i.e., the AC voltage Vac is applied to the full-wave rectifier circuit 20). As such, the power factor correction IC 25 can detect not only the interruption of the AC voltage Vac but also the restoration thereof.

In addition, the timer circuit 101 may measure the predetermined time period Tx, for example, using a charging circuit configured to charge a capacitor or the like with a predetermined bias current. However, considering variations in a bias current, a capacitance of a capacitor, and the like, the predetermined time period Tx can be precisely measured by using the counter 111.

In addition, the D flip-flop 110 according to an embodiment of the present disclosure latches (holds) the signal Vc2, which is the comparison result of the comparator 100, at a timing of a fall of the drive signal Vq1, which is a timing when the NMOS transistor 26 is turned off from on. In general, before the drive signal Vq1 goes low, the NMOS transistor 26 is on, and thus in a state where the AC voltage Vac is input, the inductor current IL according to the AC voltage Vac flows. In an embodiment of the present disclosure, the D flip-flop 110 can hold the signal Vc2 which is the result of the comparison between the inductor current IL and the current value Ic not in timing in which the NMOS transistor 26 is off, but in timing in which the NMOS transistor 26 is on. Accordingly, the detection circuit 53 can precisely detect whether the AC voltage Vac is interrupted.

In addition, in an embodiment of the present disclosure, the turn-on timer circuit 73 is operated after the interruption of the AC voltage Vac, and thus the NMOS transistor 26 is periodically turned on. Accordingly, in an embodiment of the present disclosure, the restoration of the AC voltage Vac can be detected, with the detection circuit 53 when detecting the interruption thereof.

In addition, the predetermined time period Tx is set so as to be longer than a time period in which the inductor current IL when the AC voltage Vac is applied to the full-wave rectifier circuit 20 and the NMOS transistor 26 is turned on is smaller than the current value Ic in the half cycle of the AC voltage Vac, and the predetermined time period Tx is set so as to be shorter than the half cycle of the AC voltage Vac.

Thus, in an embodiment of the present disclosure, it is possible to detect whether the AC voltage Vac is interrupted in a short period of time.

In addition, when the interruption of the AC voltage Vac is detected, and the high signal Vd is output to the terminal CONT, the microcomputer 12 controls the load 11 so as to be in a light load condition. Accordingly, the output voltage Vout is restrained from greatly dropping, and thus when the AC voltage Vac is restored, the output voltage Vout at the target level can be generated in a short period of time.

Embodiments of the present disclosure described above are simply for facilitating the understanding of the present disclosure and are not in any way to be construed as limiting the present disclosure. The present disclosure may variously be changed or altered without departing from its essential features and encompass equivalents thereof.

In an embodiment of the present disclosure, it is assumed that the signal Vd from the detection circuit 53 is output to the terminal CONT, however, it is not limited thereto. For example, a logic circuit or the like configured to turn off the NMOS transistor 26 in response to the high signal Vd may be provided.

In addition, the counter 111 may, for example, decrement the count value C without incrementing it. Even with the use of such a counter, it is possible to realize the timer circuit 101 as in an embodiment of the present disclosure.

What is claimed is:

1. An integrated circuit for a power supply circuit that includes
    a rectifier circuit configured to rectify an alternating current (AC) voltage,
    an inductor configured to receive a rectified voltage from the rectifier circuit, and
    a transistor configured to control an inductor current flowing through the inductor,
the integrated circuit being configured to switch the transistor based on the inductor current and an output voltage of the power supply circuit generated from the AC voltage, the integrated circuit comprising:
    a comparison circuit configured to compare a current value of the inductor current and a first current value; and
    a timer circuit configured to receive a first comparison result from the comparison circuit indicating that the current value of the inductor current is smaller than the first current value, and output a first signal indicating that the AC voltage is interrupted, upon detecting that the current value of the inductor current has been smaller than the first current value for a predetermined time period.

2. The integrated circuit according to claim 1, wherein the timer circuit receives a second comparison result from the comparison circuit indicating that the current value of the inductor current is larger than the first current value, and outputs a second signal indicating that the AC voltage is applied to the rectifier circuit in response to the second comparison result.

3. The integrated circuit according to claim 2, wherein the inductor current increases in response to turning on of the transistor while the AC voltage is applied to the rectifier circuit, and
the timer circuit includes
    a holding circuit configured to hold an output of the comparison circuit each time the transistor is turned on,
    a counter configured to reset a count value when the output of the comparison circuit held by the holding circuit is the second comparison result, and increment the count value when the output of the comparison circuit held by the holding circuit is the first comparison result, and a signal output circuit configured to output the first signal until the count value reaches a predetermined count value, and output the second signal when the count value reaches the predetermined count value, the predetermined count value corresponding to the predetermined time period.

4. The integrated circuit according to claim 3, wherein the holding circuit holds the output of the comparison circuit at a time when a drive signal is changed from a logic level for turning on the transistor to a logic level for turning off the transistor.

5. The integrated circuit according to claim 4, further comprising:

a first pulse circuit configured to output a first pulse signal each time the inductor current decreases to a second current value;

a second pulse circuit configured to output a second pulse signal having a predetermined cycle when an output of the first pulse signal is stopped; and a drive signal output circuit configured to output the drive signal in response to the first pulse signal and the second pulse signal.

6. The integrated circuit according to claim 1, wherein the predetermined time period is longer than a first time period in which the current value of the inductor current, when the AC voltage is applied to the rectifier circuit and the transistor is turned on, is smaller than the first current value, in a second time period corresponding to a half cycle of the AC voltage, the predetermined time period being shorter than the second time period.

7. The integrated circuit according to claim 1, further comprising:

a terminal from which the first signal is output from the integrated circuit, wherein the terminal is connected to a control circuit configured to reduce power consumption of a load in response to the first signal, the load being configured to receive the output voltage of the power supply circuit.

8. A power supply circuit configured to generate an output voltage from a predetermined alternating current (AC) voltage, the power supply circuit comprising:

a rectifier circuit configured to rectify the predetermined AC voltage;

an inductor configured to receive a rectified voltage from the rectifier circuit;

a transistor configured to control an inductor current flowing through the inductor; and an integrated circuit configured to drive the transistor based on the inductor current and the output voltage, the integrated circuit including a comparison circuit configured to compare a current value of the inductor current and a predetermined current value, and a timer circuit configured to receive a comparison result from the comparison circuit indicating that the current value of the inductor current is smaller than the predetermined current value, and output a signal indicating that the AC voltage is interrupted, when the current value of the inductor current has been smaller than the predetermined current value for a predetermined time period.

* * * * *